US010994688B2

(12) United States Patent
Berta

(10) Patent No.: US 10,994,688 B2
(45) Date of Patent: May 4, 2021

(54) AIRBAG COVERING

(71) Applicant: Dr. Ing. h.c. F. Porsche Aktiengesellschaft, Stuttgart (DE)

(72) Inventor: Christian Berta, Calw (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 125 days.

(21) Appl. No.: 16/380,052

(22) Filed: Apr. 10, 2019

(65) Prior Publication Data

US 2019/0322236 A1    Oct. 24, 2019

(30) Foreign Application Priority Data

Apr. 18, 2018 (DE) ............... 10 2018 109 172.9

(51) Int. Cl.
| | |
|---|---|
| *B60R 21/215* | (2011.01) |
| *B32B 7/05* | (2019.01) |
| *B32B 3/26* | (2006.01) |
| *B32B 7/12* | (2006.01) |
| *B60R 21/205* | (2011.01) |
| *B60R 13/02* | (2006.01) |

(52) U.S. Cl.
CPC ............ *B60R 21/215* (2013.01); *B32B 3/263* (2013.01); *B32B 7/05* (2019.01); *B32B 7/12* (2013.01); *B60R 21/205* (2013.01); *B32B 2605/003* (2013.01); *B60R 13/0256* (2013.01)

(58) Field of Classification Search
CPC . B60R 21/215; B60R 21/205; B60R 13/0256; B32B 7/05; B32B 3/263; B32B 7/12; B32B 2605/003

USPC ........................................................ 280/732
See application file for complete search history.

(56) References Cited

U.S. PATENT DOCUMENTS

| | | | | |
|---|---|---|---|---|
| 7,014,209 | B2 * | 3/2006 | Muller | ............... B60R 21/2165 280/728.3 |
| 8,567,814 | B2 * | 10/2013 | Crittenden | .......... B60R 21/2165 280/728.3 |
| 2005/0087963 | A1 * | 4/2005 | Dailey | .................. B60R 21/205 280/728.3 |

(Continued)

FOREIGN PATENT DOCUMENTS

| | | | | |
|---|---|---|---|---|
| DE | 10 2006 025 666 | | 12/2007 | |
| DE | 102006025666 | A1 * | 12/2007 | ......... B60R 21/2165 |

(Continued)

OTHER PUBLICATIONS

Machine Translation of DE102006025666 (Year: 2006).*

*Primary Examiner* — James A English
*Assistant Examiner* — Kurtis Nielson
(74) *Attorney, Agent, or Firm* — Gerald E. Hespos; Michael J. Porco; Matthew T. Hespos

(57) ABSTRACT

An airbag covering for use in a motor vehicle has a support (2) with an airbag deployment opening (4) that is closed by an airbag cover. A decorative material (6) is connected to the support (2) by an adhesive layer (9) in at least one region (10) adjacent to the airbag deployment opening (4). To simplify the production of the airbag covering, the support (2) has, in the region (10) adjacent to the airbag deployment opening (4), at least one depression (51-55) that reduces an adhesive force between the support (2) and the decorative material (6) in a targeted manner.

12 Claims, 2 Drawing Sheets

(56) References Cited

U.S. PATENT DOCUMENTS

| | | | | |
|---|---|---|---|---|
| 2005/0121818 A1* | 6/2005 | Cowelchuk | ............. | B29C 70/78 |
| | | | | 264/138 |
| 2006/0131844 A1* | 6/2006 | Trevino | ............. | B60R 21/2165 |
| | | | | 280/728.3 |
| 2006/0267314 A1* | 11/2006 | Yasuda | ............... | B60R 21/2165 |
| | | | | 280/728.3 |
| 2008/0073885 A1* | 3/2008 | Cowelchuk | ........... | B60R 21/217 |
| | | | | 280/728.3 |
| 2012/0237712 A1* | 9/2012 | Thielhorn | ............... | B32B 3/263 |
| | | | | 428/43 |
| 2014/0234564 A1* | 8/2014 | Tomaj | ................. | B60R 21/2165 |
| | | | | 428/43 |
| 2015/0298640 A1* | 10/2015 | Tomaj | ....................... | B32B 5/18 |
| | | | | 428/43 |
| 2016/0137154 A1* | 5/2016 | Sasu | ................... | B60R 21/2165 |
| | | | | 280/728.3 |
| 2016/0375634 A1 | 12/2016 | Magunia et al. | | |

FOREIGN PATENT DOCUMENTS

| | | | | |
|---|---|---|---|---|
| DE | 10 2009 002 309 | | 8/2010 | |
| DE | 102009032580 A1 * | 3/2011 | ......... | B60R 21/2165 |
| DE | 10 2015 110 403 | | 8/2016 | |
| EP | 1588906 A1 * | 10/2005 | ......... | B60R 21/2165 |
| JP | 2012176663 A * | 9/2012 | ........... | B60R 21/205 |
| WO | WO-2019038114 A1 * | 2/2019 | ........... | B60R 21/215 |

* cited by examiner

AIRBAG COVERING

CROSS REFERENCE TO RELATED APPLICATION

This application claims priority under 35 USC 119 to German Patent Appl. No. 10 2018 109 172.9 filed on Apr. 18, 2018, the entire disclosure of which is incorporated herein by reference.

BACKGROUND

Field of the Invention. The invention relates to an airbag covering, in particular for use in a motor vehicle, having a support that comprises an airbag deployment opening that is closed by an airbag cover. The airbag covering has a decorative material that is connected to the support by an adhesive layer in at least one region adjacent to the airbag deployment opening. The invention further relates to a method for producing such an airbag covering.

Related Art. German patent DE 10 2015 110 403 B3 discloses an equipment part with airbag arrangement for the interior of a motor vehicle having a support and an airbag module. Both the airbag module and the support have depressions that are arranged opposite one another. The depressions create cavities that are filled with adhesive to increase the bonding action of the adhesive.

German patent DE 10 2009 002 309 B3 discloses an airbag covering for use in a motor vehicle. The airbag covering has a layered structure with at least two layers that are connected areally to one another by adhesive. At least one tear-open seam is defined by one or more locally limited weakening(s) in the airbag covering. Perforations and/or blind holes are incorporated in the airbag covering next to the tear-open seam. The adhesive is present to engage behind at least one layer of the airbag covering through the perforations and/or blind holes.

German patent DE 10 2006 025 666 B4 discloses a covering for an airbag for use in a motor vehicle. The covering has a support material with a tear-open line, and at least one laminating material arranged above the support material. Adhesive bonds the individual materials areally to one another, wherein, in at least one limited region on at least one of two materials arranged above one another. An areally limited intermediate layer is arranged directly on at least one of the materials. As a result the adhesive bonding of the materials arranged above one another is weakened in the region of the intermediate layer.

It is an object of the invention to improve the production of an airbag covering for use in a motor vehicle where the airbag material has a support and a decorative material. The support has an airbag deployment opening that is closed by an airbag cover. The decorative material is connected to the support by an adhesive layer in at least one region adjacent to the airbag deployment opening. A further object is provide the adhesion in an expedient and defined manner. As a result, the production is intended to be reliable in process terms.

SUMMARY

The invention relates to an airbag covering for a motor vehicle. The airbag covering has a support with an airbag deployment opening that is closed by an airbag cover. The airbag covering has a decorative material that is connected to the support by an adhesive layer in at least one region adjacent to the airbag deployment opening. A region of the support adjacent to the airbag deployment opening has at least one depression that controls an adhesive force between the support and the decorative material in a targeted manner. The support may comprise plural depressions to reduce the adhesive force between the support and the decorative material. The decorative material may be leather. In addition to a decoration, such as leather, the decorative material can also comprise a knitted spacer fabric.

The support may have no contact with the adhesive layer in the region of the depression. A cavity may be formed between the support and the adhesive layer in the region of the depression to reduce the adhesive force.

The adhesive layer may have a constant thickness. More particularly, the adhesive layer may have a thickness in the region of the depression that is the same as a thickness in regions surroundings of the depression where the support is connected to the decorative material by the adhesive layer. The constantly thick adhesive layer advantageously ensures that the adhesive of the adhesive layer does not fill the depression and simplifies the production.

The adhesive layer may be applied homogeneously to the support and may be applied uniformly to the support during the production of the airbag covering. Thus, adhesive layer is ensured of having a thickness in the region of the depression that is the same thickness as outside of the depression.

The depression may be configured as a groove or channel in the support. For example, the depression may have a substantially trapezoidal cross section that widens toward the outside, that is to say toward the decorative material.

In one embodiment, the support is a dashboard body, and the airbag module may be integrated into the dashboard body. The dashboard body serves, the airbag covering and the decorative material may constitute a dashboard in a motor vehicle.

The support also may be a door cladding or the like. In principle, the covering is possible at all locations where airbag coverings open or are triggered.

The decorative material may comprise a decoration and, for example, a knitted spacer fabric. The decoration may be leather and may be connected to the knitted spacer fabric in an integrally bonded manner. The knitted spacer fabric may be arranged between the decoration and the adhesive layer.

The invention also relates to a method for producing the above-described airbag covering. The method may comprise selecting the shape, the size and the profile of the at least one depression with respect to a specific project to set the adhesive force in the region adjacent to the airbag deployment opening. The support may comprise a plurality of depressions, and the number of depressions is taken into consideration and chosen for the specific project, in particular in a dashboard for a specific vehicle type, to set the adhesive force in the region adjacent to the airbag deployment opening.

The method may comprise incorporating the depressions in the region adjacent to the airbag deployment opening to realize a desired reduction in the adhesive force. The method may comprise using a mold for forming the depressions, and the mold may further be used for forming the dashboard body or other such support. For this purpose, a negative shape of the support with the depressions is created in the mold.

The invention further relates to a support, in particular a dashboard body, for an above-described airbag covering.

The invention also optionally relates to a mold for producing such a support.

Further advantages, features and details of the invention will emerge from the description below in which various exemplary embodiments are described in detail with reference to the drawing.

DETAILED DESCRIPTION

Figure 1:
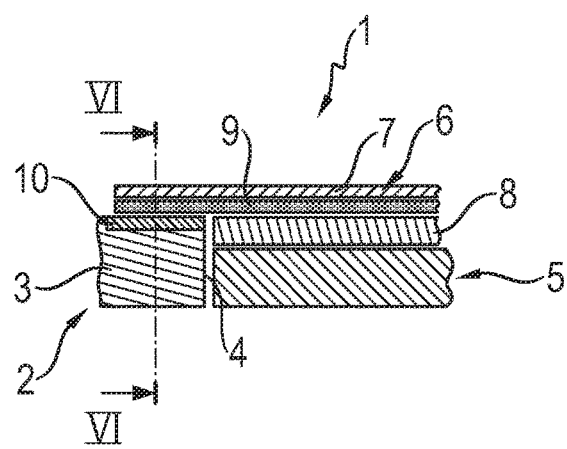
FIG. 1 is a cross section view of an airbag covering with a closed airbag cover.
Figure 2:
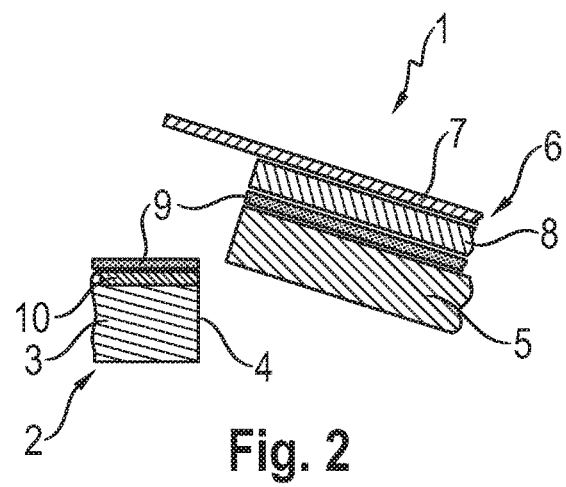
FIG. 2 is the same sectional view as in FIG. 1 with partially opened airbag cover.
Figure 3:
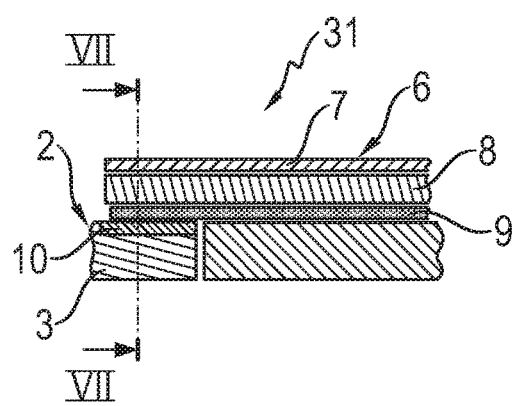
FIG. 3 is a similar illustration to FIG. 1 with a decorative material that comprises a knitted spacer fabric.
Figure 4:
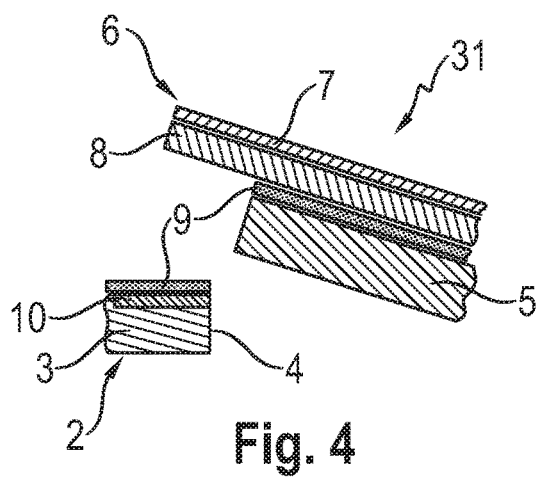
FIG. 4 shows the airbag covering of FIG. 3 with a partially opened airbag cover.

FIGS. 1 to 4 depict two exemplary embodiments of an airbag covering 1; 31 in section with a closed airbag cover 5 (FIGS. 1 and 3) and with partially opened airbag cover 5 (FIGS. 2 and 4). The airbag covering 1 comprises a support 2. The support 2, in this embodiment, is a dashboard body 3 of a dashboard in a motor vehicle.

The support 2 comprises an airbag deployment opening 4 that can be closed by an airbag cover 5. Arranged under the airbag cover 5 is an airbag module that comprises an airbag which, upon activation of the airbag module, and with the airbag cover 5 opened, is shot out through the airbag deployment opening 4 in the support 2 into an interior of the motor vehicle equipped with the dashboard and is inflated.

The airbag covering 1; 31 comprises a decorative material 6. In the exemplary embodiment of the airbag covering 1 that is illustrated in FIG. 1, the decorative material 6 comprises only one decoration 7, for example leather.

In the exemplary embodiment of the airbag covering 31 that is illustrated in FIG. 3, the decorative material 6 comprises, in addition to the decoration 7, also a knitted spacer fabric 8. In FIG. 3, the knitted spacer fabric 8 is connected to the decoration 7 in an integrally bonded manner, for example.

In the exemplary embodiment of the airbag covering 1 that is illustrated in FIG. 1, a knitted spacer fabric 8 is arranged on the upper side of the airbag cover 5. The decorative material 6 is connected in an integrally bonded manner by an adhesive layer 9 to the support 2 and to the knitted spacer fabric 8 on the airbag cover 5.

In the embodiment of the airbag covering 31 that is illustrated in FIGS. 3 and 4, the knitted spacer fabric 8 is between the adhesive layer 9 and the decoration 7.

In the case of both airbag coverings 1 and 31, a region 10 that surrounds the airbag deployment opening 4 is equipped with at least one depression (not indicated in further detail in FIGS. 1 to 4) that reduces an adhesive force between the support 2 and the decorative material 6 in a targeted manner in the region 10 adjacent to the airbag deployment opening 4.

It can be seen in FIGS. 2 and 4 that the airbag cover 5, upon opening with the decorative material 6, is released relatively easily from the support 2 so that the adhesive layer 9 remains substantially on the support 2 in the region 10 adjacent to the airbag deployment opening 4. This is achieved by the fact that the adhesive force in the region 10 adjacent to the airbag deployment opening 4 is reduced in a targeted manner by the at least one depression.

Figure 5:
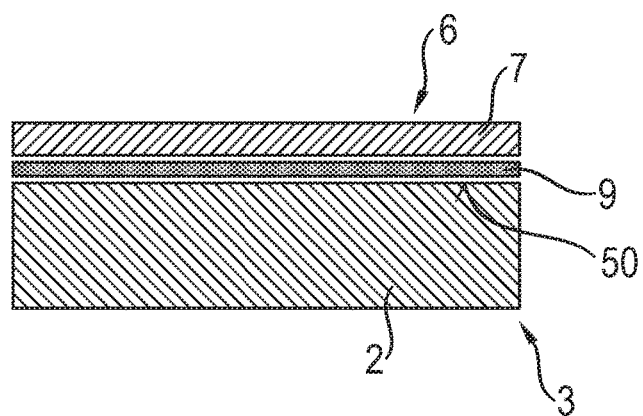
FIG. 5 shows a section through a conventional dashboard.

It is shown in FIG. 5 that a conventional support 2 has, on its side facing the decorative material 6, a planar surface 50 that is connected over its full area to the adhesive layer 9. This results in a relatively large adhesive force between the support 2 and the decorative material 6.

Figure 6:
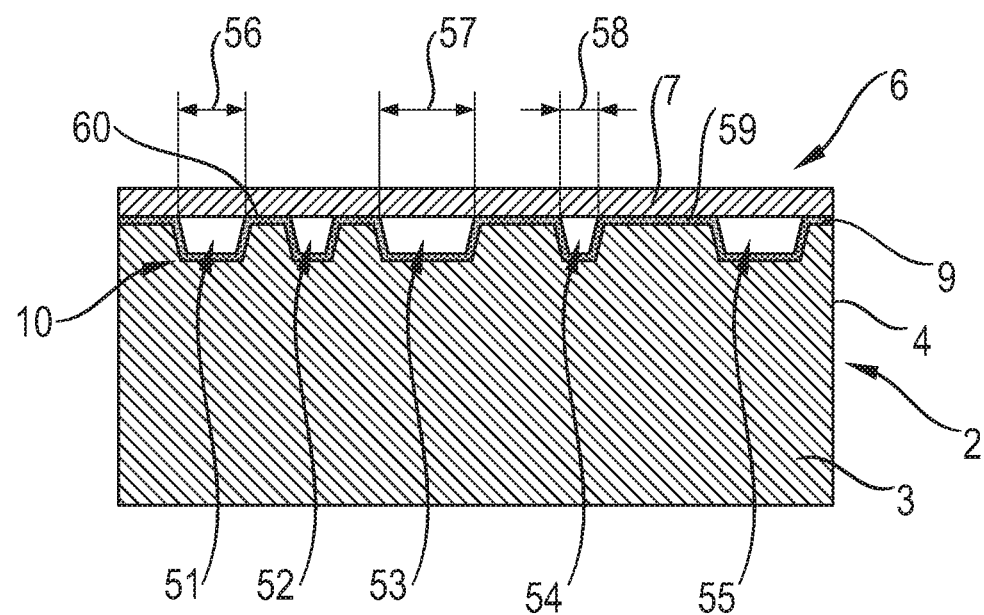
FIG. 6 is a cross section taken along the line VI-VI in FIG. 1.
Figure 7:
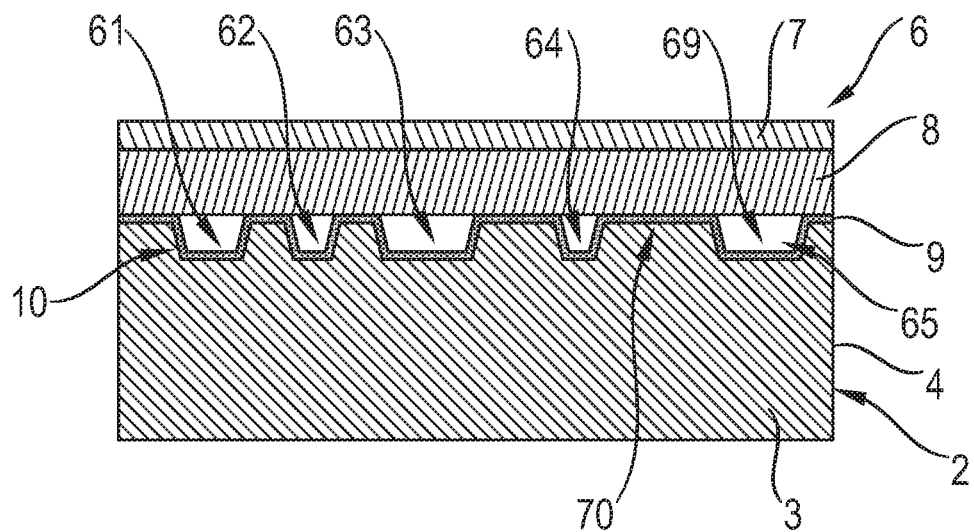
FIG. 7 shows the view of a section along the line VII-VII in FIG. 3.

FIGS. 6 and 7 depict sectional views along the lines VI-VI in FIG. 1 and VII-VII in FIG. 3. It can be seen in the sectional views of FIGS. 6 and 7 that the support 2 has five depressions 51 to 55; 61 to 65. The depressions 51 to 55; 61 to 65 are configured as relief channels in the dashboard body 3 to reduce the adhesive force between the support 2 and the decorative material 6 in a targeted manner.

FIG. 6 indicates, by means of dimensioning references 56 to 58 of different size, that the relief channels 51, 53 and 54 can have different widths. Moreover, it can be seen in FIG. 6 that the adhesive layer 9, as also in FIG. 7, is applied homogeneously and with uniform thickness to the support 2.

Thus, in the region of the depressions 51 to 55, 61 to 65, cavities are formed between the support 2 with the adhesive layer 9 and the decorative material 6, that is to say the decoration 7 in FIG. 6 and the knitted spacer fabric 8 in FIG. 7. A corresponding cavity is designated by 69 in FIG. 7.

The support 2 has direct contact with the adhesive layer 9 in contact regions (59, 60 in FIGS. 6 and 70 in FIG. 7) between the depressions (54, 55 or 51, 52 in FIGS. 6 and 64, 65 in FIG. 7).

In the regions having the depressions 51 to 55; 61 to 65, the adhesion between the support and the decorative material 6 is reduced. In the contact regions 59, 60; 70, the adhesion between the support 2 and the decorative material 6 is not reduced.

What is claimed is:

1. An airbag covering for use in a motor vehicle, comprising a support that includes an airbag deployment opening that is closed by an airbag cover, and having a decorative material that is connected to the support by an adhesive layer in at least one region adjacent to the airbag deployment opening, wherein the support has, in a region adjacent to the airbag deployment opening, at least one groove that reduces an adhesive force between the support and the decorative material in a targeted manner.

2. The airbag covering of claim 1, wherein the support has no contact with the adhesive layer in the region of the groove.

3. The airbag covering of claim 2, wherein the adhesive layer has a constant thickness.

4. The airbag covering of claim 2, wherein the adhesive layer has a constant thickness.

5. The airbag covering of claim 1, wherein the adhesive layer is applied homogeneously to the support.

6. The airbag covering of claim 1, wherein the support is a dashboard body.

7. The airbag covering of claim 1, wherein the decorative material comprises a decoration and a knitted spacer fabric.

8. A method for producing the airbag covering of claim 1, comprising selecting a shape, a size and a profile of the at least one groove with respect to a specific project to set an adhesive force in the region adjacent to the airbag deployment opening.

9. The method of claim 8, further comprising incorporating a plurality of the grooves in the region adjacent to the airbag deployment opening to realize a desired reduction in the adhesive force.

10. An airbag covering for a motor vehicle, comprising:
a support that includes an airbag deployment opening and an outer surface adjacent the airbag deployment opening, the outer surface of the support including at least one depression;
an adhesive layer applied to the outer surface of the support, including parts of the outer surface defining the at least one depression therein;
an airbag cover covering the airbag deployment opening in the support; and
an outer layer facing the outer surface of the support and connected to the adhesive layer at locations adjacent the at least one depression, wherein the outer layer spans the at least one depression without being adhered to portions of the adhesive layer in the at least one depression, and wherein dimensions of the at least one depression are selected to achieve a specified adhesive force between the outer layer and the outer surface of the support.

11. The airbag covering of claim 10, wherein the at least one depression is at least one groove.

12. The airbag covering of claim 10, wherein the at least one depression is at least one channel.

* * * * *